(12) United States Patent
Lie (10) Patent No.: US 6,659,215 B1
(45) Date of Patent: Dec. 9, 2003

(54) FOUR WHEEL DRIVE, FOUR WHEEL STEERING VEHICLE

(76) Inventor: Svein Olaf Lie, Smestuveien 21, N-1480 Slattum (NO)

( * ) Notice: Subject to any disclaimer, the term of this patent is extended or adjusted under 35 U.S.C. 154(b) by 0 days.

(21) Appl. No.: 09/763,966

(22) PCT Filed: Sep. 1, 1999

(86) PCT No.: PCT/NO99/00271

§ 371 (c)(1),
(2), (4) Date: Mar. 29, 2001

(87) PCT Pub. No.: WO00/12374

PCT Pub. Date: Mar. 9, 2000

(30) Foreign Application Priority Data

Sep. 1, 1998 (NO) ........................................... 19984011

(51) Int. Cl.$^7$ ............................................. B60K 17/22
(52) U.S. Cl. .................. 180/237; 180/267; 180/384; 280/102; 280/786
(58) Field of Search ................... 180/376, 379, 180/312, 384, 237, 234, 235, 238, 266, 267, 252; 280/638, 26, 100, 102, 782, 785, 786

(56) References Cited

U.S. PATENT DOCUMENTS

| | | | |
|---|---|---|---|
| 1,197,977 A | * | 9/1916 | Wallick |
| 1,339,124 A | * | 5/1920 | Morton |
| 1,352,141 A | * | 9/1920 | Outcalt |
| 1,416,613 A | * | 5/1922 | Colardeau |
| 1,529,630 A | | 3/1925 | Jonkhoff |
| 1,776,446 A | * | 9/1930 | Norelius |
| 1,811,798 A | | 6/1931 | Lucke |
| 2,756,835 A | * | 7/1956 | Muller |
| 2,903,080 A | * | 9/1959 | Ritter |
| 3,669,202 A | * | 6/1972 | Andersen ..................... 280/102 |
| 3,800,899 A | * | 4/1974 | Thwaites ..................... 280/100 |
| 4,982,976 A | * | 1/1991 | Kramer ....................... 280/426 |
| 5,020,627 A | * | 6/1991 | Wittke ......................... 180/234 |
| 5,125,284 A | | 6/1992 | Carriere |
| 5,368,121 A | * | 11/1994 | Priefert ........................ 180/209 |
| 5,595,398 A | * | 1/1997 | Brown ..................... 280/763.1 |

FOREIGN PATENT DOCUMENTS

| | | | |
|---|---|---|---|
| FR | A513099 | | 2/1921 |
| FR | 513099 | * | 2/1921 |

* cited by examiner

Primary Examiner—Anne Marie Boehler
(74) Attorney, Agent, or Firm—Birch, Stewart, Kolasch & Birch, LLP (57) ABSTRACT

The present invention relates to a four-wheel drive vehicle which on account of its constructive composition has very good off-road characteristics, in addition to which the vehicle can be adapted to a number of transport requirements and can act as a tool carrier. The vehicle is substantially frameless in the traditional sense with a front and rear rigid differential axle mounted on a beam or frame extending centrally in the vehicle's longitudinal direction, where at least one of the axles can rotate about the vehicle's longitudinal axis, while at the same time both of the vehicle's axles are each steered in the opposite direction to each other about their axes perpendicularly to the vehicle's longitudinal axis.

13 Claims, 5 Drawing Sheets

FOUR WHEEL DRIVE, FOUR WHEEL STEERING VEHICLE

This application is the national phase under 35 U.S.C. § 317 of PCT International Application No. PCT/NO99/00271 which has an International filing date of Sep. 1, 1999, which designated the United States of America.

The present invention relates to a four-wheel drive vehicle which on account of its constructive composition has very good off-road characteristics, in addition to which the vehicle can be adapted to a number of transport requirements and can act as a tool carrier. The vehicle is substantially frameless in the traditional sense with a front and a rear rigid differential axle mounted on a beam or frame extending centrally in the vehicle's longitudinal direction, where at least one of the axles can rotate about the vehicle's longitudinal axis, while at the same time both of the vehicle's axles are each steered in the opposite direction to each other about their axes perpendicularly to the vehicle's longitudinal axis.

In previously known off-road vehicles for leisure use, construction use, forestry work and military applications, the use of four-wheel drive is known on vehicles with a front and a rear differential axle, possibly combined with a differential brake or differential lock in one or both of the axles. In addition some vehicles have a centre differential. These vehicles, however, are frame-based and the differential axles are attached to the vehicle's frame through a complicated springing arrangement with stabiliser bars, etc. in order to provide the best possible ground contact for all four wheels for driving on difficult terrain as well as adequate driving comfort. Ordinary cross-country vehicles for leisure, construction or forestry work, however, are very expensive as well as requiring a lot of maintenance, and despite their design they often have clear limitations with regard to cross-country characteristics associated, e.g., with maximum tolerable lateral tilt, ability to move around in rugged terrain, manoeuvrability in steep terrain as well as on slippery or uneven surfaces. Moreover, in a great many parts of the world there is a need for a simple, inexpensive vehicle which can be used as a basis for various transport requirements as well as within different construction areas where the ability to move around easily and transport capacity, simple maintenance and low purchase price are the key words.

One of the most vulnerable features of an ordinary frame vehicle, when it is used in rugged terrain, occurs in connection with stresses which are created in the frame's structure. In order to reduce these stresses and undesirable stress concentrations the frame is often designed to be relatively narrow while the vehicle's axles are connected to the frame by means of a spring arrangement and stabilising devices. With regard to the spring arrangement and stabilising devices, however, it is desirable to mount these as far out towards the axles' end point as possible, which is not consistent with a narrow frame. Ordinary frame vehicles are therefore generally compromise solutions between the desire for low levels of stress and stress concentrations in the frame and the desire to have the vehicle's springing and stabilising mounted as far out towards the ends of the axles as possible. Furthermore, the steering of ordinary frame vehicles is connected with sophisticated forecarriages which individually steer each wheel on each side of the vehicle on an axle. This in turn entails a vulnerable link in connection with motive power on the driving wheels, while at the same time the vehicle's ability to move around will be even more vulnerable due to the fact that the driving wheels are only mounted at one end of the vehicle and if the vehicle travels in very rugged terrain this could result in at least one of the driving wheels being out of contact with the ground, thereby substantially impairing the vehicle's steering and manoeuvrability. In addition, the forecarriage structure on ordinary frame vehicles involves a highly sophisticated technical solution which demands careful maintenance and which in addition is extremely expensive to purchase as well as being subject to damage on the individual parts of the forecarriage.

Some of the drawbacks of a traditional off-road vehicle, however, are overcome with a frame-steered vehicle, but these cannot have undivided loads over their full vehicle length.

A vehicle according to the goals set forth in the above is provided in the present invention principally by reducing the number of technically sophisticated elements in a vehicle to a minimum while at the same time the vehicle's design provides good driving capability in the terrain as well as representing good possibilities for use in commercial applications of various types, such as, e.g., construction work, forestry, agriculture, emergency help in impassable places, etc. The vehicle is particularly well suited to delivering loads and goods to locations with extremely poor accessibility due to impassable roads, etc. This may include, e.g., delivering food, medicines and other necessary equipment to areas which either for natural reasons are inaccessible or which have been affected by natural disasters which cause roads to be impassable, e.g. due to floods, earthquakes or the like. In areas with constant poor accessibility due, e.g., to the annual rainy season or the like which reduces the possibility of using traditional vehicles, a vehicle according to the invention will offer the possibility of delivering necessary goods despite access roads which are highly impassable. The vehicle is also very light which gives a higher load capacity. Thus it is also possible to move the vehicle on earth roads and paths with poor carrying capacity.

Furthermore, a vehicle according to the present invention will be able to be utilised as a tool carrier, e.g. for agriculture, construction work or forestry. Due to the vehicle's extremely good manoeuvrability, the vehicle will be able to be used, for example, in agricultural areas with very steep terrain, which will permit fertile areas in accessible places to be utilised with mechanical equipment to a greater extent than at present. Moreover, a vehicle according to the present invention will be able to be employed for forestry work where, on account of its extremely good manoeuvrability, the vehicle will be able to be used as a tool carrier in felling areas with difficult access. For example, the vehicle may be used in connection with tools for felling or lopping branches off trees while also being used for loading and transporting trees from inaccessible parts of the felling area to, e.g., the piling yard or sawmill. In a preferred embodiment a vehicle according to the present invention is well suited to forestry, e.g. in developing countries where it is essential to use vehicles which are highly capable of moving around on difficult terrain, while at the same time being inexpensive to purchase and easy to maintain and in such places the vehicle can be equipped to cover several vehicle functions, such as, e.g., loading and unloading while also being used for transport from felling area to, for example, sawmill.

It is therefore an object of the present invention to provide such a vehicle which has the above-mentioned characteristics and which in addition avoids the above-mentioned critical elements and which is uncritical with regard to surface and terrain, while at the same having good loading characteristics, a low purchase price and easy maintenance in addition to being capable of being produced in a simple manner, for example locally in the vicinity of the place where it has to be used. This object is achieved with a vehicle according to the present invention as indicated in the introductory part of the following claim 1, with special characteristics as indicated in the characterising part of claim 1. Further embodiments are set forth in the following dependent patent claims.

In its basic form the vehicle according to the present invention consists of a beam or framed structure extending in the vehicle's longitudinal direction, one end of which is provided with a first turntable/slew ring or the like which supports a rigid differential axle, thereby enabling it to rotate in the turntable's/slew ring's plane of rotation about an axis extending perpendicularly on the vehicle's longitudinal axis. At the opposite end of the vehicle's beam or framed structure relative to the first turntable/slew ring with differential axle, there is mounted a second turntable/slew ring or the like which is rotatably connected with the vehicle's longitudinal beam or frame about the vehicle's longitudinal axis, while this turntable/slew ring is also provided with a rigid differential axle which thereby can also rotate about an axis extending perpendicularly on the vehicle's longitudinal axis. The differential axles are furthermore interconnected, with the result that they are rotated in the opposite direction to each other and provided that the differential axles' width is the same, the wheels on the rear axle will thereby follow the wheel tracks on the front axle. Differences in the stresses between the axles are thereby avoided, thus eliminating the need for a centre differential. This opposing rotational relationship may, for example, be achieved with stays or wire extending diagonally from the front axle's right side to the rear axle's left side, and the reverse, or individual electrical, pneumatic or hydraulic steering of each axle can be provided, which is controlled by a common steering device which thereby provides for the asynchronous steering of the two axles.

The vehicle's unique ability to reach difficult areas and cross-country characteristics described herein are a result of the relatively opposing steering of the two axles, combined with the fact that both the axles have synchronous drive.

An alternative synchronisation of the differential axles' rotation about the turntables/slew rings as a replacement for the wires or stays may be provided by mounting gear rims on each of the turntables/slew rings or in connection therewith. The gear rims are operated by respectively synchronised motors. In a further embodiment linear motors may be employed, one end of which engages a turntable substantially tangentially and the other end is connected to the frame or beam in the vehicle. In a further alternative embodiment the vehicle's steering can also be connected to this transmission.

In an embodiment of the present invention one of the vehicle's turntables/slew rings with differential axle is securely connected with the beam or frame centrally extending in the vehicle's longitudinal direction, while the other turntable/slew ring with differential axle is rotatably connected with the beam or frame extending in the vehicle's longitudinal direction about the vehicle's longitudinal axis. In a further embodiment both turntables/slew rings with differential axles are mounted on beams or frames extending in the vehicle's longitudinal direction, which beams or frames are rotatably connected with each other about an axis extending in the vehicle's longitudinal direction. In one embodiment the beam extending centrally in the vehicle's longitudinal direction is a tubular body, one end of which is securely connected to a turntable/slew ring with differential axle, while in the opposite end of the tube bearings are provided on the inside or the outside of the tube, thus enabling a further tube connected with the second turntable/slew ring with differential axle to be mounted rotatably about the first tube's longitudinal axis. In a further embodiment mounting is provided by means of bearing blocks or the like on the underside of the beam or frame extending in the vehicle's longitudinal direction and a turntable or slew ring with differential axle is provided rotatably about the vehicle's longitudinal axis for mounting. The vehicle's load-bearing surface or utility surface will be able to be provided in the vehicle's frame or beam extending in the longitudinal direction, as, e.g. the tubular body and in a preferred embodiment, therefore, the relative point of rotation about the vehicle's longitudinal direction for the two turntables/slew rings with differential axles is placed as near the end of the vehicle's centrally located beam or frame as possible. However, if the vehicle's beam or frame extending in the longitudinal direction is rotatably connected in the area between the two turntables/slew rings with rigid differential axles, some distance from both turntables/slew rings, it will be possible to provide load-bearing surfaces or utility equipment on both of the centrally located beams or frames extending in the vehicle's longitudinal direction.

By mounting a slew ring or turntable at each end of the vehicle according to the present invention, this vehicle will turn with all four wheels while all four wheels simultaneously have constant drive and even though one of the vehicle's wheels is out of contact with the ground, the vehicle will still have three wheels which in addition to providing motive power can also assist in steering the vehicle, while at the same time the rotation of at least one of the slew rings/turntables with differential axle about the vehicle's longitudinal axis causes the two axles to adapt to a great extent to the unevenness of the surface and ensure that all of the vehicle's wheels are in contact with the surface at all times. This provides stable progress and excellent steering potential while also thereby enabling the vehicle to travel in terrain which causes very steep lateral tilting of the vehicle, or which is very steep in the longitudinal direction.

In a further alternative embodiment of the present invention a vehicle is provided wherein both the front and rear turntables with differential axle are rotatably connected with the vehicle's beam or frame extending in the longitudinal direction. In this case the vehicle will have a centrally located frame part or beam between two rotatably connected turntables/slew rings with rigid differential axles, and any load-bearing device thereby has to be mounted on the underside of the frame part or beam extending centrally in the vehicle. Thus it will be possible to use the vehicle as a pack vehicle, and by mounting the frame element or beam which extends centrally in the vehicle at a height above the ground it will be possible to use the vehicle in extremely rugged terrain with an underhung load attached to the vehicle's centrally extending frame element or beam. A vehicle of this type has particular application in those cases where it will be difficult or impossible to place the desired load up on top of a load carrier, and a vehicle of this type will therefore be well suited to the transport of, for example, large sacks, underhung barrels or large underhung construction elements which are mounted on to the vehicle's central frame part or beam by means of, e.g., a jack hoist, another hoisting system or the like, thereby enabling very heavy load elements to be lifted up under the vehicle's central load-carrying part.

In alternative embodiments of a vehicle according to the present invention the vehicle's length can be altered by having the beam or frame extending centrally in the vehicle designed in such a way that it can be divided and a connecting piece can be inserted. In a preferred embodiment the division point is at the bearing point where one of the vehicle's turntables/slew rings with rigid differential axle is rotatably mounted about the vehicle's axis extending in the longitudinal direction, wherein the vehicle is divided and a connecting piece is inserted, whereupon the connecting piece is securely connected with either the vehicle's frame part or beam extending in the longitudinal direction, or connected with the rotatably connected turntable/slew ring with rigid differential axle. If the connecting piece is not securely connected with any of these parts, the connecting piece will rotate freely about the vehicle's longitudinal axis and thus it may be employed as a pack vehicle if this is desirable. Alternatively, the centrally extending frame element or beam may be dividably designed with a flange connection or the like which permits the beam or frame to be divided and a connecting piece to be inserted in order to alter the vehicle's length. In a further alternative embodiment the beam or frame may be telescopically extendible.

The propulsion of a vehicle according to the present invention may be effected in different ways. The common feature, however, is that the vehicle according to the present invention requires synchronous drive of the two differential axles which are rotatably connected to each other about the vehicle's longitudinal axis. In one embodiment the differential on each of the vehicle's axles is connected to a hydraulic motor. The vehicle is moved by the hydraulic propulsion engines being connected in series, which means that the amount of hydraulic medium which is displaced through one motor is also displaced through the next, which will lead to synchronous drive of both axles. In a further embodiment the differential on each of the axles is provided with T-drive which in turn is connected to a common axle, extending in the vehicle's longitudinal direction. In this case it will be possible to install an engine beside one of the T-drives, at any end of the vehicle, possibly with a gear box and the vehicle is started by standard slip friction such as a clutch, or in the case of an automatic gear box by a clutch arrangement. If hydraulic motors in series are employed, the vehicle's engine will be able to be mounted as required in a suitable location on the vehicle and the engine, connected to a hydraulic pump, is connected to the vehicle's hydraulic motors via hoses, pipes or the like.

In one embodiment the vehicle may be provided with a separate engine for running the vehicle or it can be provided with a connection, for example, for a power output on a second vehicle. The latter embodiment is particularly relevant if the vehicle according to the present invention is arranged as a trailer with independent drive in connection with an additional vehicle of the same type or, e.g. a tractor or the like. In one embodiment the vehicle according to the present invention may be provided with a driver's seat where a driver can control the vehicle's progress and steering, or the vehicle may be provided with remote control, cordless or with wires, thus enabling a driver to move in the vicinity of the vehicle in order to control it. The latter solution eliminates the safety and comfort sides of providing a driver's seat on the vehicle. This also makes it easier to utilise the vehicle's full length as it will not be restricted by the driver's seat in the vehicle's longitudinal direction. Moreover, effective loading space will be simpler to utilise if no driver's seat has to be provided. The cost aspect will also be affected and without the need for a driver's seat on the vehicle it will be possible to further reduce the costs.

On account of the vehicle's limited springing the speed will have to be reduced in order to avoid unnecessary severe stresses on the vehicle's central frame part or beam, as well as stresses on the transition between the vehicle's differential axles and turntables. Extra springing characteristics in the vehicle can be achieved, for example, by providing torsion springs in the vehicle's longitudinal direction which are connected with each of the relatively rotatably mounted parts of the vehicle's central frame or beam part. In order to further protect the vehicle against severe stresses and stress concentrations during movement in rough terrain, or during movement at higher speed on a smooth surface, shock absorbers may be provided in order to cushion road impact. This facility is particularly suitable in the embodiment where bearing blocks are employed on the lower edge of the vehicle's beam or frame. One or more shock absorbers and possibly one or more springs such as spiral springs, leaf springs or the like are then mounted between the vehicle's frame or beam and the turntable/slew ring with differential axle rotatably connected with the frame or beam.

In a further alternative embodiment of the present invention there is provided in connection with the vehicle's central beam or frame part a motor with through-going piston rod and crankshaft at both ends, such as for example a Sterling motor/gas motor.

A vehicle according to the present invention is further described and exemplified in connection with the attached figures, in which:

FIG. 4*b* is a view from the rear of the embodiment illustrated in FIG. 4*a.

Figure 1:
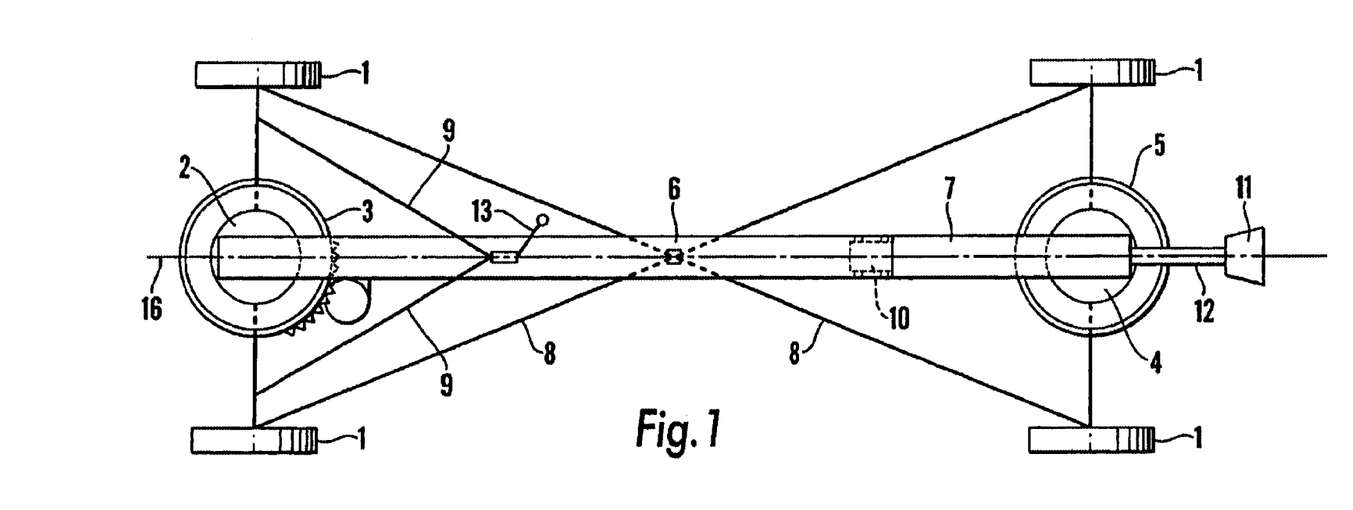
FIG. 1 is a schematic view from above of the basic elements in a vehicle according to the present invention.
Figure 2:
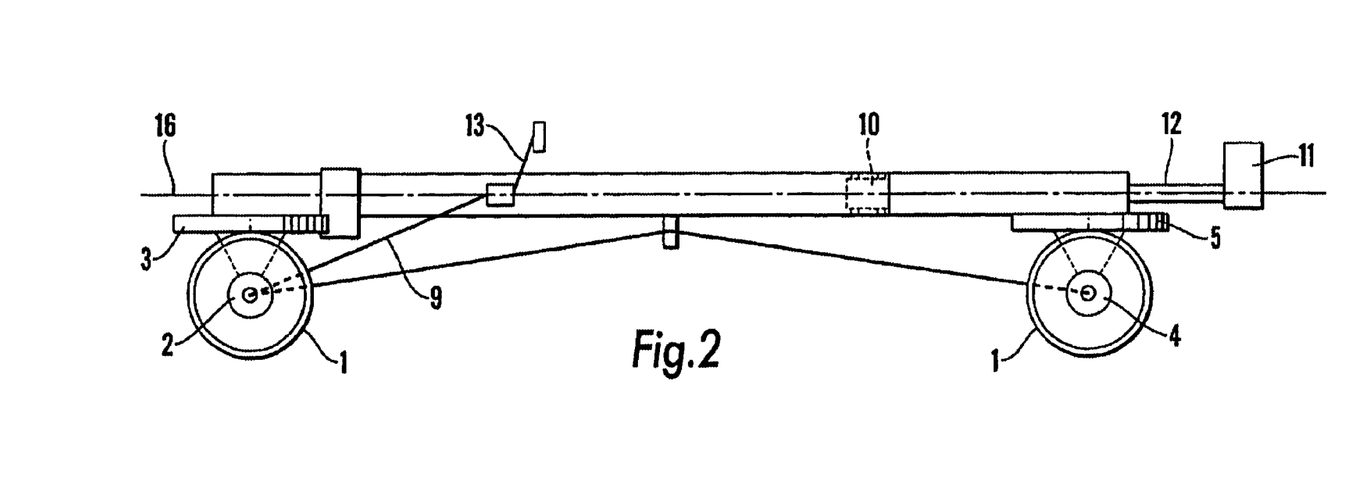
FIG. 2 is a schematic side view of the basic elements in a vehicle according to the present invention.

In FIGS. 1 and 2 the basic elements in a vehicle according to the present invention are illustrated, where the vehicle has a first rigid differential axle 2 and a second rigid differential axle 4, each of which is provided with wheels or pairs of wheels 1. The differential axle 2 is connected with a slew ring or a turntable 3, which in turn is connected with a beam or a frame element 6 extending in the vehicle's longitudinal direction. Furthermore, the differential 4 is connected with a slew ring or a turntable 5 which in turn is connected with a beam or a frame part 7 which also extends in the vehicle's longitudinal direction. The beam or frame part 6 and 7 respectively are rotatably connected with each other about the vehicle's longitudinal axis by a rotating bearing 10, according to the present invention. Furthermore, the slew rings or turntables 3 and 5 are so mounted that the differential axles 2 and 4 can rotate about axes extending perpendicularly on the vehicle's longitudinal axis. Moreover, according to the present invention the differential axles 2 and 4 are connected with steering devices which rotate both axles in opposite directions to each other, thus causing the wheels on the following axle to go in the wheel tracks of the wheels on the leading axle, if the axle width is the same. The synchronisation of the axles' steering may be implemented, e.g. by wire 8 which diagonally connects the left side of the front axle with the right side of the rear axle, and the right side of the front axle with the left side of the rear axle respectively. Any load-bearing equipment or tools are placed on the frame(s) or beam(s) 6, 7 extending in the vehicle's longitudinal direction. In a preferred embodiment of the present invention rotating bearings 10 are mounted in the vicinity of one of the turntables/slew rings 3, 5 as illustrated, for example, in FIG. 3 and load-carrying equipment or tools are preferably placed on the beam or frame part 6.

As illustrated in FIGS. 1 and 2 power for running the vehicle is supplied from a motor 11 via a transmission 12 to the rear differential 4. As previously described the transmission 12 may be an axle with a universal joint which transfers the motor's 11 power to a T-drive which in turn distributes power to the differential 4 and on to the differential 2 via a rigid axle extending in the vehicle's longitudinal direction, preferably internally in the beam or frame element 6 and 7. As illustrated in FIGS. 1 and 2 the beam or frame element 6 and 7 is a tubular body which can receive an internally located drive shaft which connects the differentials 4 and 2. Alternatively, the transmission 12 may be a transfer of a hydraulic medium from a hydraulic pump in connection with the motor 11 to a hydraulic motor (not shown) in connection with the differential 4 and where the hydraulic medium passes on to a hydraulic motor connected with the differential 2 before returning to a reservoir for the hydraulic pump in connection with the motor 11.

As illustrated in FIGS. 1 and 2 the vehicle is further steered by means of a steering device 13 which transfers steering movement via a wire, stay or the like 9 to the differential axle 2. The differential axle 2 rotates the turntable 3, pulling along with it the differential axle 4 which rotates on the turntable/slew ring 5 about the vehicle's longitudinal frame element or beam 6, 7 respectively.

Figure 3:
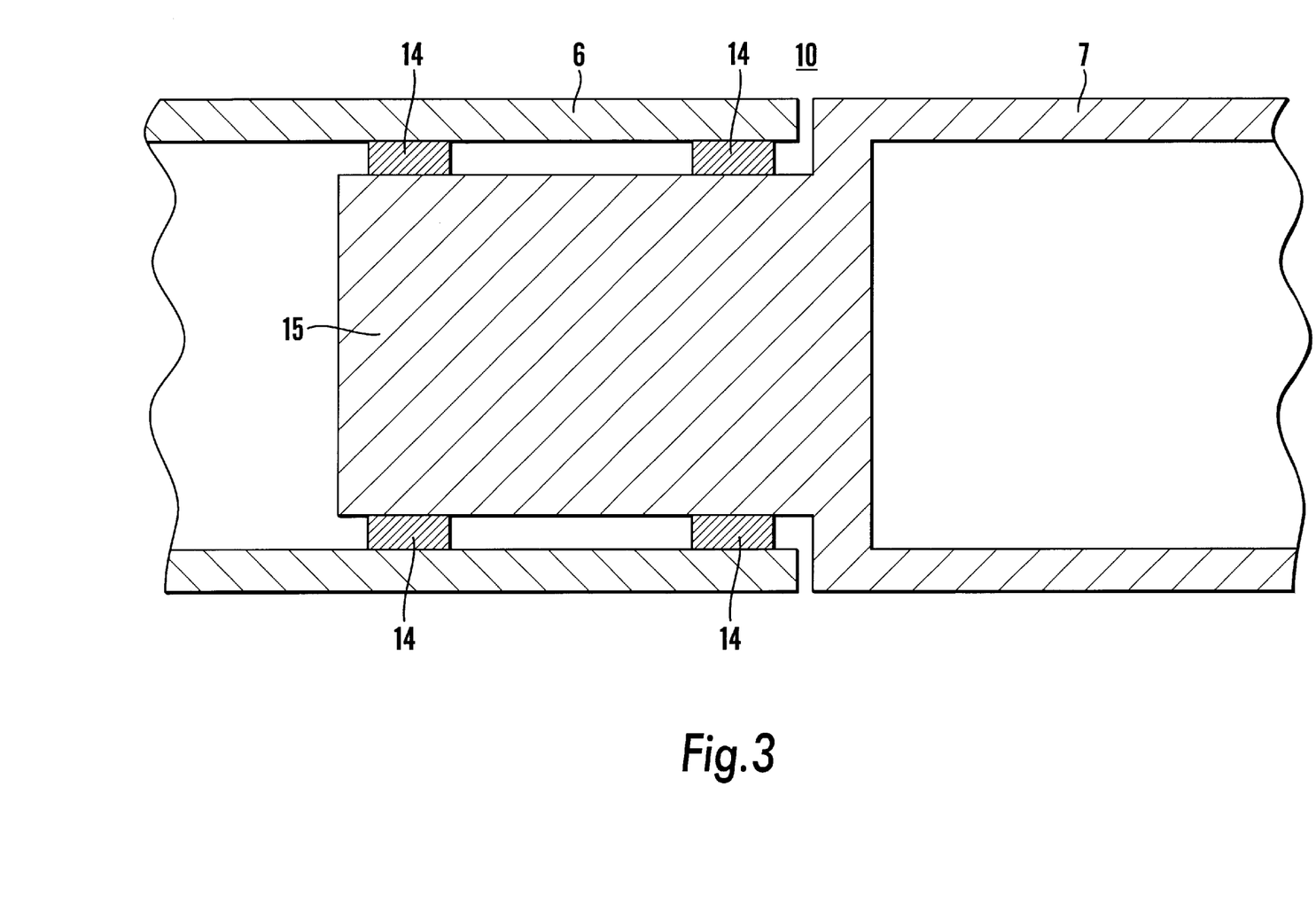
FIG. 3 is a sectional view from the side of details of an embodiment of the rotating bearing in the vehicle's longitudinal direction.

FIG. 3 further illustrates in detail an example of a rotating bearing 10 which rotatably connects the vehicle's longitudinal beam or frame part 6 with the beam or frame part 7. Here the beam 6 is a tubular body 6 with an open end. The beam 7 is similarly a tubular body with an internal outwardly projecting trunnion or axle 15. Furthermore, on the inside of the tubular body 6 there are provided bearing surfaces 14 which have an internal opening adapted to the diameter of the outwardly projecting trunnion 15 on the tubular body 7. The tubular body 6 can thereby be rotated relative to the tubular body 7 about the vehicle's longitudinal axis 16. The tubes 6 and 7 are held together as shown by the wires 8.

Figure 4A:
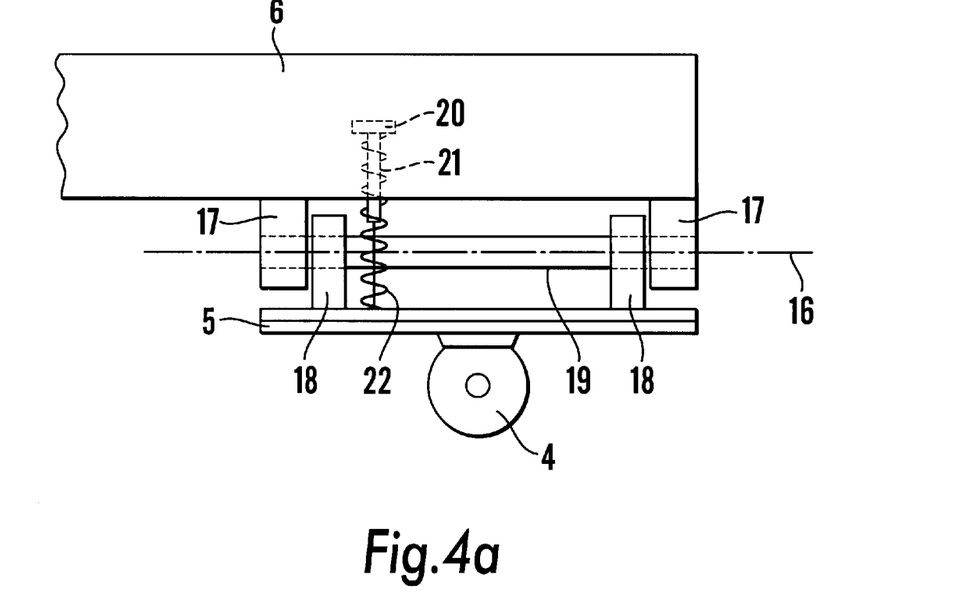
FIG. 4*a* is a side view of an alternative embodiment of a part of a vehicle according to the present invention.
Figure 4B:
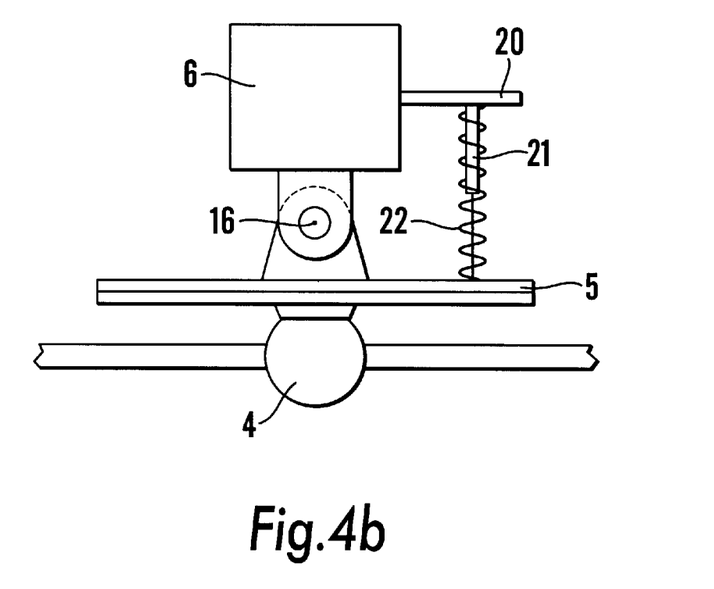

In FIGS. 4a and 4b there is illustrated an embodiment of a part of a vehicle according to the present invention wherein under the frame 6 there are mounted bearing blocks 17 where an axle 19 is rotatably mounted. On the rotatable axle 19, via blocks 18, which are securely connected to the axle 19, there is mounted a slew ring or turntable 5 with a differential axle 4 which is thereby rotatably connected to the frame or beam 6 about the axis 16 extending in the vehicle's longitudinal direction. Alternatively, the axle 19 may be securely connected in the blocks 17 and the blocks 18 can rotate about the axle 19. FIGS. 4a and 4b further illustrate that springing and shock absorption are provided, a shock absorber 21 and spiral spring 22 being provided between a bracket 20 on the beam or frame 6 and the slew ring or turntable.

Figure 5:
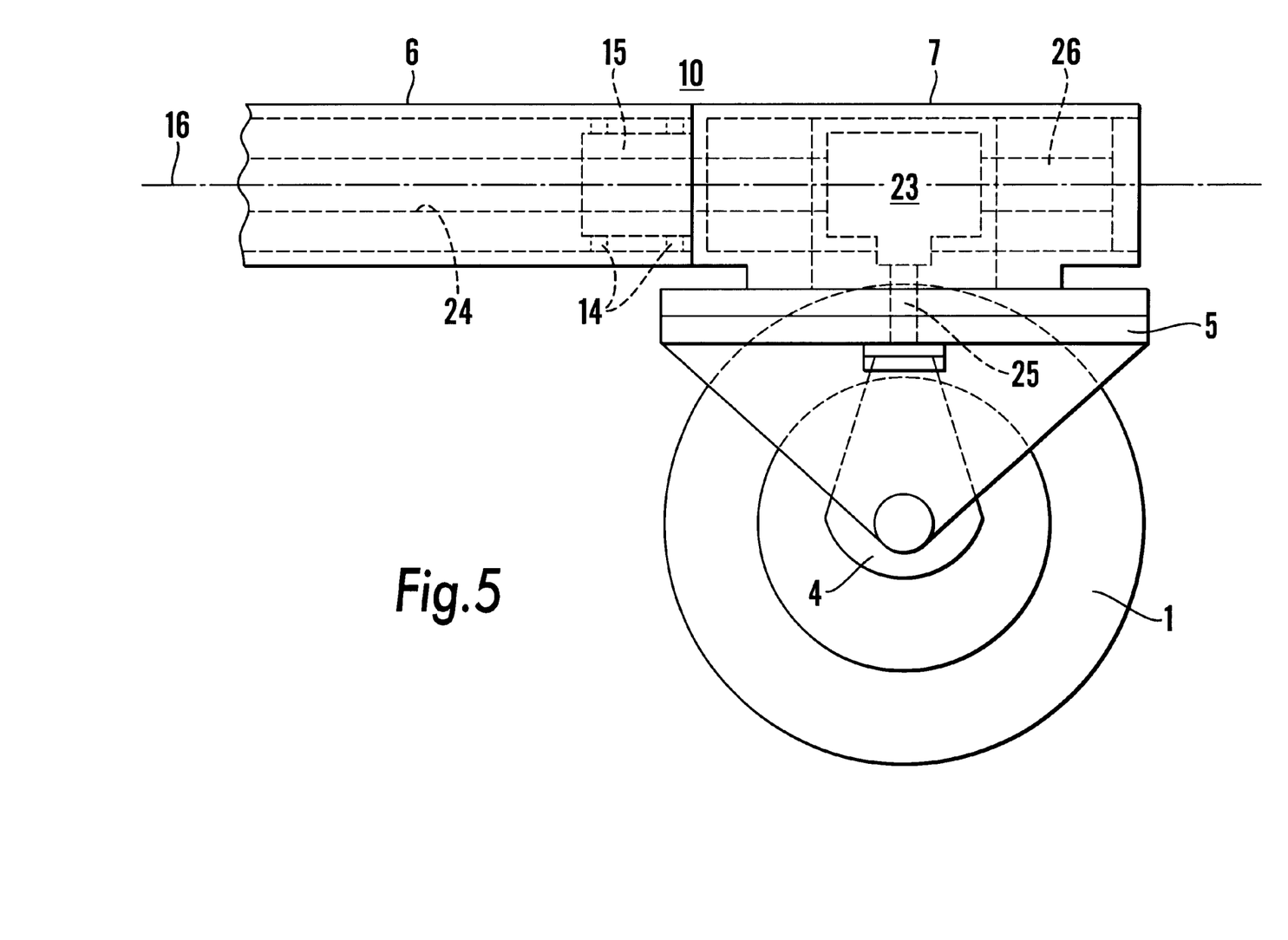
* and FIG. 5 is a sectional view from the side of details concerning power transmission to a rigid differential axle on a vehicle according to the present invention.

There is further illustrated in detail in FIG. 5 an embodiment of the present invention where the transmission of motive power to the differential axle 4 is implemented via a rigid axle 24 to a T-drive 23 and on via the transmission 25 to the differential 4. The drive shaft 24 is located internally in the tubular beam element 6 which is rotatably connected with the tubular beam element 7 via the rotating bearing 10 about the vehicle's longitudinal axis 16. From the T-drive 23 there is further provided an additional power output axle 26 which is rotated synchronously with the axle 24. The axle 26 can be employed for supply of rotational power for running the vehicle or it may be employed as a power output for a vehicle which is connected in series, for example a similarly designed vehicle without its own motor 11 and transmission 12. Thus it will be possible to connect several vehicles in series with only one motor package. Alternatively, this may also be implemented by transfer of hydraulic media.

Figure 6:
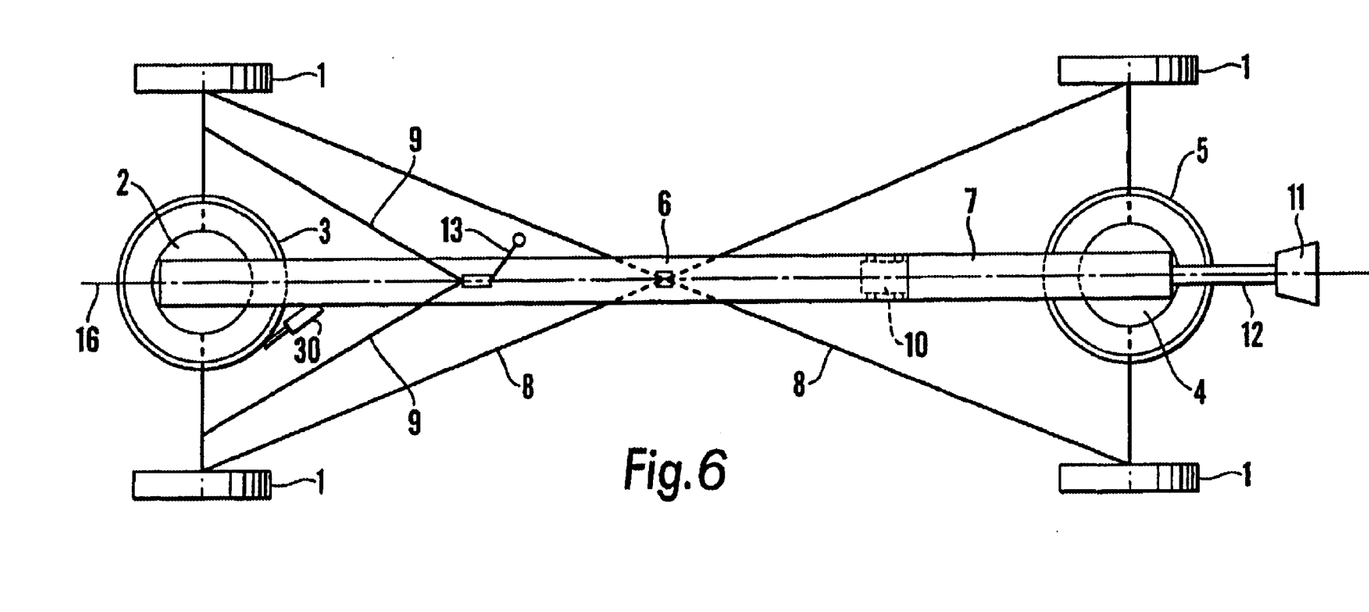
FIG. 6 is a schematic view of an additional embodiment in a vehicle according to the present invention.

An additional embodiment is shown in FIG. 6 which includes a linear motor 30 which is connected between beam 6 and turntable 3. The linear motor engages the turntable substantially tangentially and when actuated forces the turntable and axle to turn.

What is claimed is:

1. A vehicle principally for use in rugged terrain, comprising at least one beam or frame (6, 7) extending centrally in the vehicle's longitudinal direction, where the beam or frame (6, 7) is provided with a first and a second rotatable device (3, 5), each of which devices (3, 5) can rotate about an axis perpendicular to the vehicle's longitudinal axis (16), and that at least one of the rotatable devices (3, 5) is rotatably mounted relative to the beam or frame (6, 7) about the vehicle's longitudinal axis (16) and that on each of the rotatable devices (3, 5) there are mounted rigid differential axles (2, 4), the differential axles (2, 4) are provided with synchronised drive devices (23) driven by a power source and the vehicle is provided with one or more steering synchronizing devices which rotate the differential axles (2, 4) on the rotatable devices (3, 5) in a relatively opposing relationship, and that the vehicle is provided with a steering device (13, 9) for steering the vehicle, characterized in that the synchronised drive devices (23) are T-drives aligned longitudinally with an interconnecting axle (24) and above a center of said rotatable devices.

2. A vehicle according to claim 1, characterized in that the interconnecting axle (24) runs substantially inside the beam or frame (6, 7).

3. A vehicle according to claim 1, characterized in that the vehicle's frame or beam (6, 7) has a variable length.

4. A vehicle according to claim 1, characterized in that the interconnecting axle (24) has a variable length.

5. A vehicle according to claims 1, characterized in that the drive devices (23) are driven by a power source which is external relative to the vehicle.

6. A vehicle according to claim 1, characterized in that the vehicle is fitted with one or more connection devices for the power source and/or at least one of the rotatable devices to enable the vehicle to be connected to a similarly constructed, powerless trailer.

7. A vehicle according to any of the claims 1, characterized in that at least one of the rotatable devices (3, 5) is a turntable.

8. A vehicle according to any of the claims 1, characterized in that at least one of the rotatable devices (3, 5) is a slew ring.

9. A vehicle according to claim 1, characterized in that the steering synchronizing device substantially consists of elongated devices (8) which diagonally connect the right side of the first differential axle (2) with the left side of the second differential axle (4), and the left side of the first differential axle (2) with the right side of the second differential axle (4).

10. A vehicle according to claim 9, characterized in that the steering synchronizing device (8) is flexible.

11. A vehicle according to claim 8, characterized in that the steering synchronizing device includes a gear rim on each of the slew rings (3, 5), which gear rims are driven in a relatively opposing rotating manner by hydraulic, pneumatic or electric motors.

12. A vehicle according to claim 1, characterized in that the steering synchronizing device includes hydraulic linear motors mounted between the frame or the beam (6, 7) and a tangential point on each of the rotatable devices (3, 5), which linear motors are driven synchronously.

13. A vehicle according to claim 10, wherein the steering synchronizing device is one of a wire, a chain or a rope.

* * * * *